United States Patent
Watanabe

(10) Patent No.: US 7,027,085 B2
(45) Date of Patent: Apr. 11, 2006

(54) IMAGING APPARATUS

(75) Inventor: Tohru Watanabe, Ogaki (JP)

(73) Assignee: Sanyo Electric Co., Ltd., Osaka (JP)

( * ) Notice: Subject to any disclaimer, the term of this patent is extended or adjusted under 35 U.S.C. 154(b) by 763 days.

(21) Appl. No.: 10/235,246

(22) Filed: Sep. 4, 2002

(65) Prior Publication Data
US 2003/0048363 A1 Mar. 13, 2003

(30) Foreign Application Priority Data
Sep. 7, 2001 (JP) ............................. 2001-272022
Mar. 29, 2002 (JP) ............................. 2002-094744
Mar. 29, 2002 (JP) ............................. 2002-094748

(51) Int. Cl.
H04N 5/225 (2006.01)
(52) U.S. Cl. ............... 348/218.1; 348/239; 348/207.99
(58) Field of Classification Search ........... 348/211.11, 348/218.1, 239, 207.99
See application file for complete search history.

(56) References Cited

U.S. PATENT DOCUMENTS 5,159,455 A * 10/1992 Cox et al. ................. 348/218.1
2003/0117501 A1* 6/2003 Shirakawa ................ 348/218.1
2004/0130630 A1* 7/2004 Ostromek ................. 348/218.1
2005/0041123 A1* 2/2005 Ansari et al. ................ 348/264

FOREIGN PATENT DOCUMENTS

| JP | 6-105234 | 4/1994 |
| JP | 7-75022 | 3/1995 |
| JP | 7-322102 | 12/1995 |

* cited by examiner

Primary Examiner—Tuan Ho
(74) Attorney, Agent, or Firm—Fish & Richardson P.C.

(57) ABSTRACT

An imaging apparatus that has a reduced circuit scale and efficiently operates a plurality of solid-state imaging devices. The imaging apparatus includes first and second solid-state imaging devices, first and second drive circuits for driving the first and second solid-state imaging devices, and a timing control circuit for determining the vertical and horizontal scan timing of the first and second solid-state imaging devices in accordance with a reference clock signal having a fixed cycle. A selection circuit selects either one of the first and second image signals in synchronism with an operation timing of the first and second solid-state imaging devices. A signal processing circuit performs a predetermined imaging process on the selected image signal to generate image data. The selection circuit alternately selects the first and second image signals at predetermined time intervals.

19 Claims, 12 Drawing Sheets

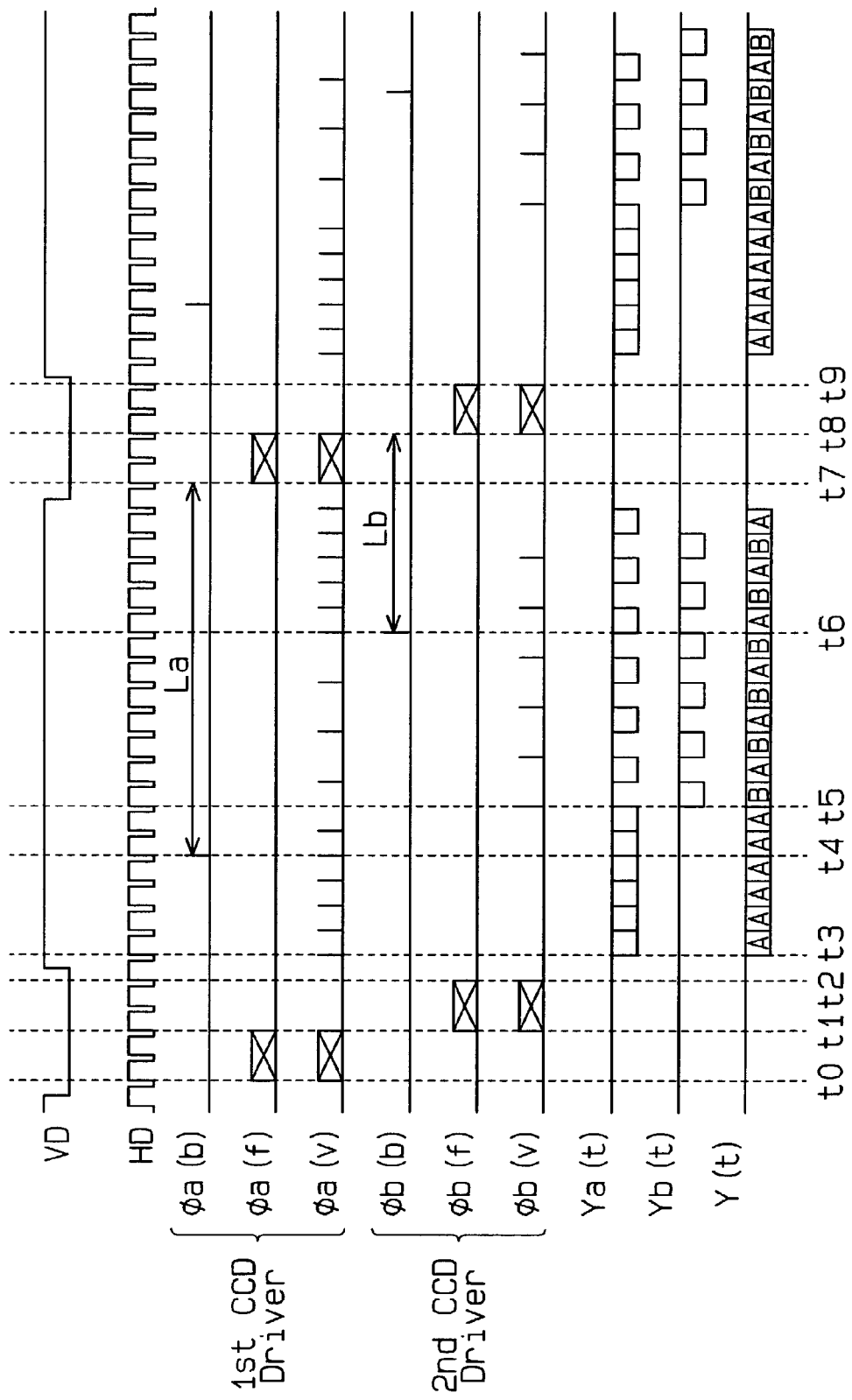

IMAGING APPARATUS

BACKGROUND OF THE INVENTION

The present invention relates to an imaging apparatus for imaging multiple subjects with a plurality of solid-state imaging devices and synthesizing image signals of multiple systems that are obtained from the solid-state imaging devices.

An imaging apparatus, such as a digital still camera, may employ a plurality of solid-state imaging devices to simultaneously image different subjects. Such an imaging device synthesizes image signals of multiple systems that are obtained from the solid-state imaging devices and, for example, displays a plurality of reproduced images on a single image display screen.

FIG. 1 is a block diagram of a prior art imaging apparatus 20 employing a plurality of solid-state imaging devices. To generate an image, or take pictures, of two subjects, the imaging apparatus 20 has first and second imaging devices 20a, 20b. A memory controller 9 controls the output of the first and second imaging devices 20a, 20b.

The first imaging device 20a, which defines a first imaging system, includes a first solid-state imaging device, or charge-coupled device (CCD) 1a, a first boost circuit 2a, a first CCD driver circuit 3a, a first timing control circuit 4a, a first analog signal processing circuit 5a, a first A/D conversion circuit 6a, a first digital signal processing circuit 7a, and a first memory 8a. The first CCD 1a includes a matrix of light receiving pixels and accumulates information charges generated in accordance with a received first subject image in the light receiving pixels. The first CCD 1a has a vertical overflow drain structure and discharges the information charges accumulated in each light receiving pixel toward a substrate. The vertical overflow drain structure causes excessive information charges generated in the light receiving pixels to be absorbed by the substrate.

The first boost circuit 2a boosts input power supply voltage Vd (not shown) to generate a boosted voltage and supplies the boosted voltage to the first CCD driver circuit 3a. The first CCD driver circuit 3a uses the boosted voltage to generate a plurality of clock pulses and provides the clock pulses to the first CCD 1a. The clock pulses are generated in accordance with various timing signals, which are provided from a first timing control circuit 4a. An image signal Y(t), which is in accordance with the charge amount of the information charges accumulated in each light receiving pixel, is retrieved from the first CCD 1a in units of single pixels.

The first timing control circuit 4a includes a plurality of counters (not shown), which count a reference clock signal CK that has a fixed cycle, and divides the reference clock signal CK to generate a vertical synchronizing signal VD and a horizontal synchronizing signal. The first timing control circuit 4a generates various timing signals, which are provided to the first CCD driver circuit 3a, at timings synchronized with the vertical and horizontal synchronizing signals VD, HD. The first CCD 1a generates an image signal Ya(t) for each line at a timing synchronized with the horizontal synchronizing signal HD and generates an image signal Ya(t) for each image display screen at a timing synchronized with the vertical synchronizing signal VD. The generated image signal Y(t) is provided to the first analog signal processing circuit 5a.

The first analog signal processing circuit 5a receives the image signal Ya(t) from the first CCD 1a and performs analog signal processing, such as a correlated double sampling (CDS) process and an automatic gain control (AGC) process, on the image signal Ya(t). In the CDS process, the image signal Ya(t), which repeats a reset level and a signal level, is clamped at the reset level. Subsequently, the signal level is extracted from the image signal Ya(t) and an image signal having a continuous signal level is generated. In the AGC process, the image signals retrieved in the CDS process are integrated in units of single image display screens or single vertical scan terms. The gain is feedback-controlled so that the integrated data is included in a predetermined range. The first A/D converter 6a receives the image signal Ya(t) from the first analog signal processing circuit 5a, standardizes the image signal Ya(t) in synchronism with the output timing of the first CCD 1a, and generates first digital image data Ya(n). The first digital image data Ya(n) is provided to the first digital signal processing circuit 7a.

The first digital signal processing circuit 7a performs processes such as color separation and a matrix operation on the first digital image data Ya(n) to generate image data Y'(n), which includes luminance data and chrominance data. The first digital signal processing circuit 7a includes an exposure controller and a white balance controller and performs exposure control, which controls the exposure state of the first CCD 1a, and a white balance correction process, which adjusts the white balance of the image signal Y(t).

The first memory 8a is a frame memory and stores the luminance data and the chrominance data from the first digital signal processing circuit 7a in response to a write command from the memory controller 9.

The second imaging device 20b, which defines a second imaging system, includes a second solid-state imaging device, or charge-coupled device (CCD) 1b, a second boost circuit 2b, a second CCD driver circuit 3b, a second timing control circuit 4b, a second analog signal processing circuit 5b, a second A/D conversion circuit 6b, a second digital signal processing circuit 7b, and a second memory 8b. The circuits of the second imaging device 20b correspond to the circuits of the first imaging device 20a and perform the same processes on a second image signal generated by the second CCD 1b.

The memory controller 9 controls the read timing of the first and second image data so that the image generated by the first imaging device 20a and the image generated by the second imaging device 20b are reproduced on a single image display screen. For example, referring to FIG. 2A, a single image display screen is divided into two sections. A first image A, which is generated by the first imaging device 20a, is shown in one section, and a second image B, which is generated by the second imaging device 20b, is shown in the other section. In this case, the first image data Ya(n), which corresponds to the first image A, and the second image data Yb(n), which corresponds to the second image B, are respectively retrieved from the first and second memories 8a, 8b. Afterward, the two pieces of image data are synthesized in accordance with the display mode of the image display screen.

In FIG. 2B, the first image A is mainly shown on the image display screen. The lower left quarter of the image display screen shows the second image B in a miniaturized state. In this case, the first image data Ya(n) that corresponds to the upper half of the image display screen is read from the first memory 8a. Then, the first image data Ya(n) and the second image data Yb(n) corresponding to the lower half of the image display screen are read from the first and second memories 8a, 8b. In this state, to show the second image B in the allocated section of the image display screen, the image data of a single image is read from the second memory 8b and compressed to one forth. The first image data Ya(n) and the compressed image data Yb(n) are then synthesized to simultaneously show the first image A and the second image B, which is miniaturized by one forth, on the same image display screen.

The conventional imaging apparatus 20 includes may circuits, such as the CCDs, the drive circuits, the timing control circuits, and the signal processing circuits. As a result, the imaging apparatus 20 has a large scale and consumes a large amount of power. Accordingly, circuits other than the CCDs may be used commonly, or combined, to reduce the circuit scale of the imaging apparatus. There are many possible combinations. However, when circuits are combined, the capacity of the imaging apparatus may decrease. For example, when the drive system is combined, plural CCDs may not be driven simultaneously. This would decrease the frame rate of each CCD.

SUMMARY OF THE INVENTION

It is an object of the present invention to provide an imaging apparatus that has a reduced circuit scale and effectively operates a plurality of CCDs.

To achieve the above object, the present invention provides an imaging apparatus having a first solid-state imaging device including a matrix of first light receiving pixels. Each of the first light receiving pixels generates an information charge in accordance with a first imaging subject and accumulates the generated information charge. A second solid-state imaging device includes a matrix of second light receiving pixels. Each of the second light receiving pixels generates an information charge in accordance with a second imaging subject and accumulates the generated information charge. A first drive circuit is connected to the first solid-state imaging device. The first drive circuit drives the first solid-state imaging device to generate a first image signal that corresponds to the information charge accumulated in each of the first light receiving pixels in accordance with a vertical scan timing and a horizontal scan timing. A second drive circuit is connected to the second solid-state imaging device. The second drive circuit drives the second solid-state imaging device to generate a second image signal that corresponds to the information charge accumulated in each of the second light receiving pixels in accordance with the vertical scan timing and the horizontal scan timing. A timing control circuit is connected to the first and second drive circuits. The timing control circuit determines the vertical and horizontal scan timing of the first and second solid-state imaging devices in accordance with a reference clock signal having a fixed cycle. A selection circuit is connected to an output of each of the first and second solid-state imaging devices. The selection circuit selects either one of the first and second image signals in synchronism with an operation timing of the first and second solid-state imaging devices. A signal processing circuit is connected to an output of the selection circuit. The signal processing circuit performs a predetermined imaging process on the selected image signal to generate image data. The selection circuit alternately selects the first and second image signals at predetermined time intervals.

A further perspective of the present invention is an imaging apparatus having a first solid-state imaging device including a matrix of first light receiving pixels. Each of the first light receiving pixels generates an information charge in accordance with a first imaging subject and accumulates the generated information charge. A second solid-state imaging device includes a matrix of second light receiving pixels. Each of the second light receiving pixels generates an information charge in accordance with a second imaging subject and accumulates the generated information charge. A first drive circuit is connected to the first solid-state imaging device. The first drive circuit drives the first solid-state imaging device to generate a first image signal that corresponds to the information charge accumulated in each of the first light receiving pixels in accordance with a vertical scan timing and a horizontal scan timing. A second drive circuit is connected to the second solid-state imaging device. The second drive circuit drives the second solid-state imaging device to generate a second image signal that corresponds to the information charge accumulated in each of the second light receiving pixels in accordance with the vertical scan timing and the horizontal scan timing. A first timing control circuit is connected to the first drive circuit. The first timing control circuit determines the vertical and horizontal scan timing of the first solid-state imaging device in accordance with a reference clock signal having a fixed cycle. A second timing control circuit is connected to the second drive circuit. The second timing control circuit determines the vertical and horizontal scan timing of the second solid-state imaging device in accordance with the reference clock signal having a fixed cycle. A selection circuit is connected to an output of each of the first and second solid-state imaging devices. The selection circuit selects either one of the first and second image signals in synchronism with an operation timing of the first and second solid-state imaging devices. A signal processing circuit is connected to an output of the selection circuit. The signal processing circuit performs a predetermined imaging process on the selected image signal to generate image data. The selection circuit alternately selects the first and second image signals at predetermined time intervals.

An imaging apparatus includes a plurality of solid-state imaging devices for generating information charges in accordance with an imaging subject and accumulating the generated information charges. A plurality of drive circuits respectively connected to the solid-state imaging devices. Each of the drive circuits drives the associated solid-state imaging device to generate an image signal that corresponds to the information charges in accordance with a vertical scan timing and a horizontal scan timing. A timing control circuit is connected to the drive circuits. The timing control circuit determines the vertical and horizontal scan timing of the solid-state imaging devices in accordance with a reference clock signal having a fixed cycle. A selection circuit is connected to the solid-state imaging devices. The selection circuit selects either one of the image signals in synchronism with an operation timing of the solid-state imaging devices. A signal processing circuit is connected to the selection circuit. The signal processing circuit performs a predetermined imaging process on the selected image signal to generate image data. The selection circuit alternately selects one of the image signals at predetermined time intervals.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 6 is a timing chart illustrating the operation of the imaging apparatus of FIG. 3;

DETAILED DESCRIPTION OF THE PREFERRED EMBODIMENTS

Figure 1:
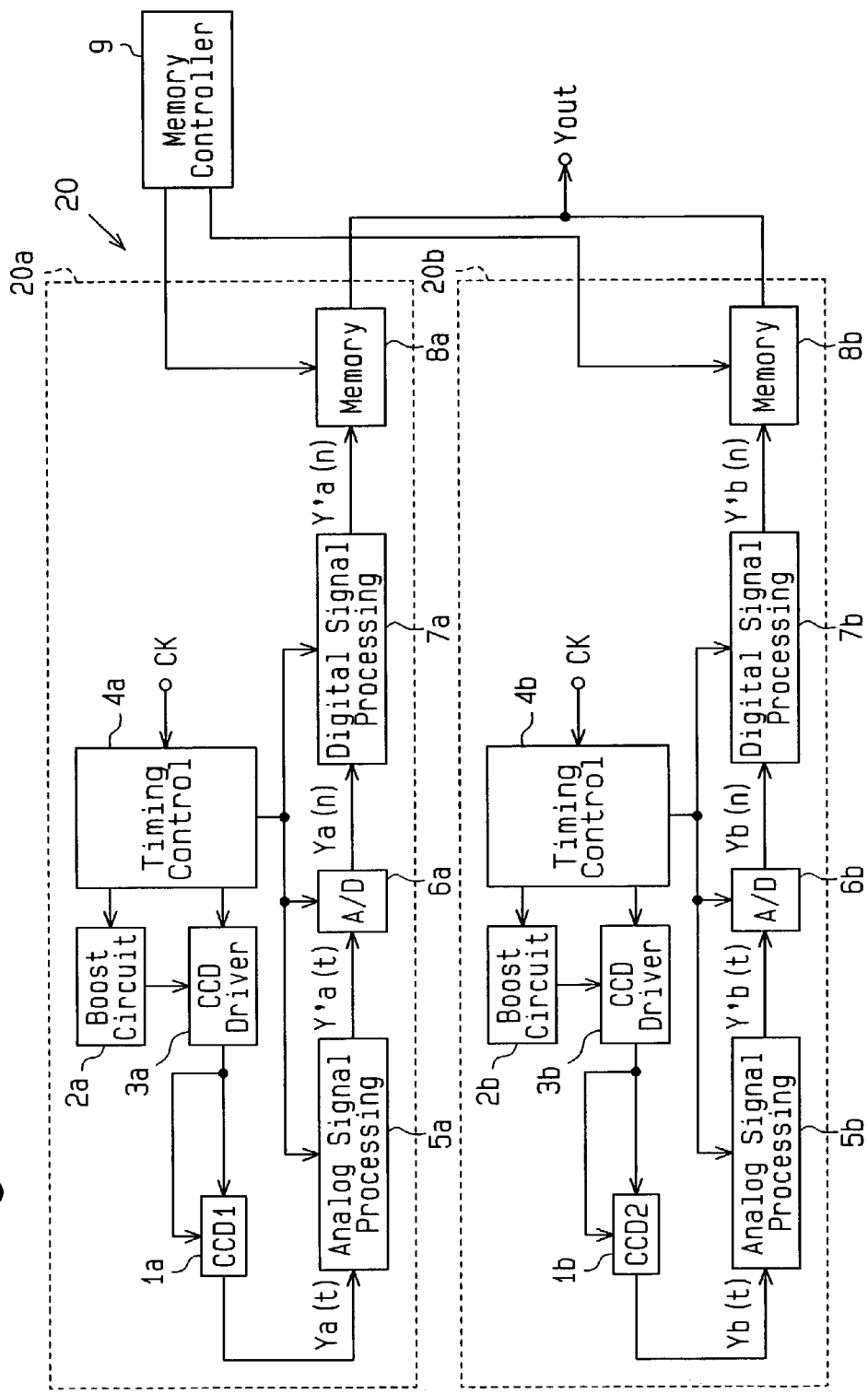
FIG. 1 is a schematic block diagram of a prior art imaging apparatus.
Figure 2A:
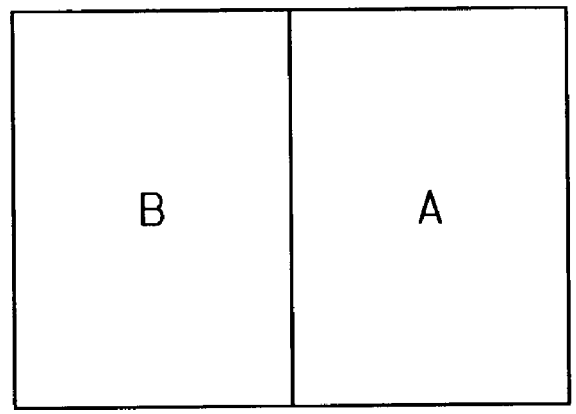
FIG. 2A is a schematic diagram showing a display mode example of the imaging apparatus of FIG. 1.
Figure 2B:
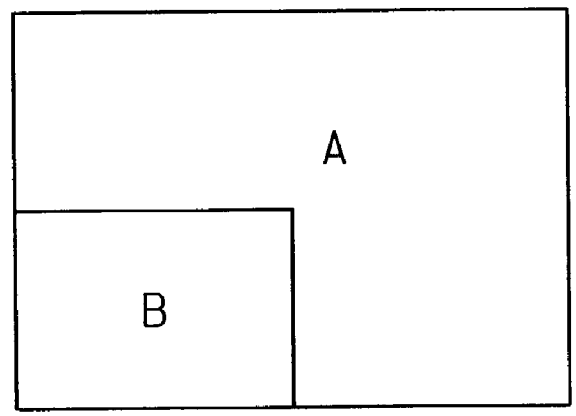
FIG. 2B is a schematic diagram showing another display mode example of the imaging apparatus of FIG. 1.

In the drawings, like numerals are used for like elements throughout.

[First Embodiment]

Figure 3:
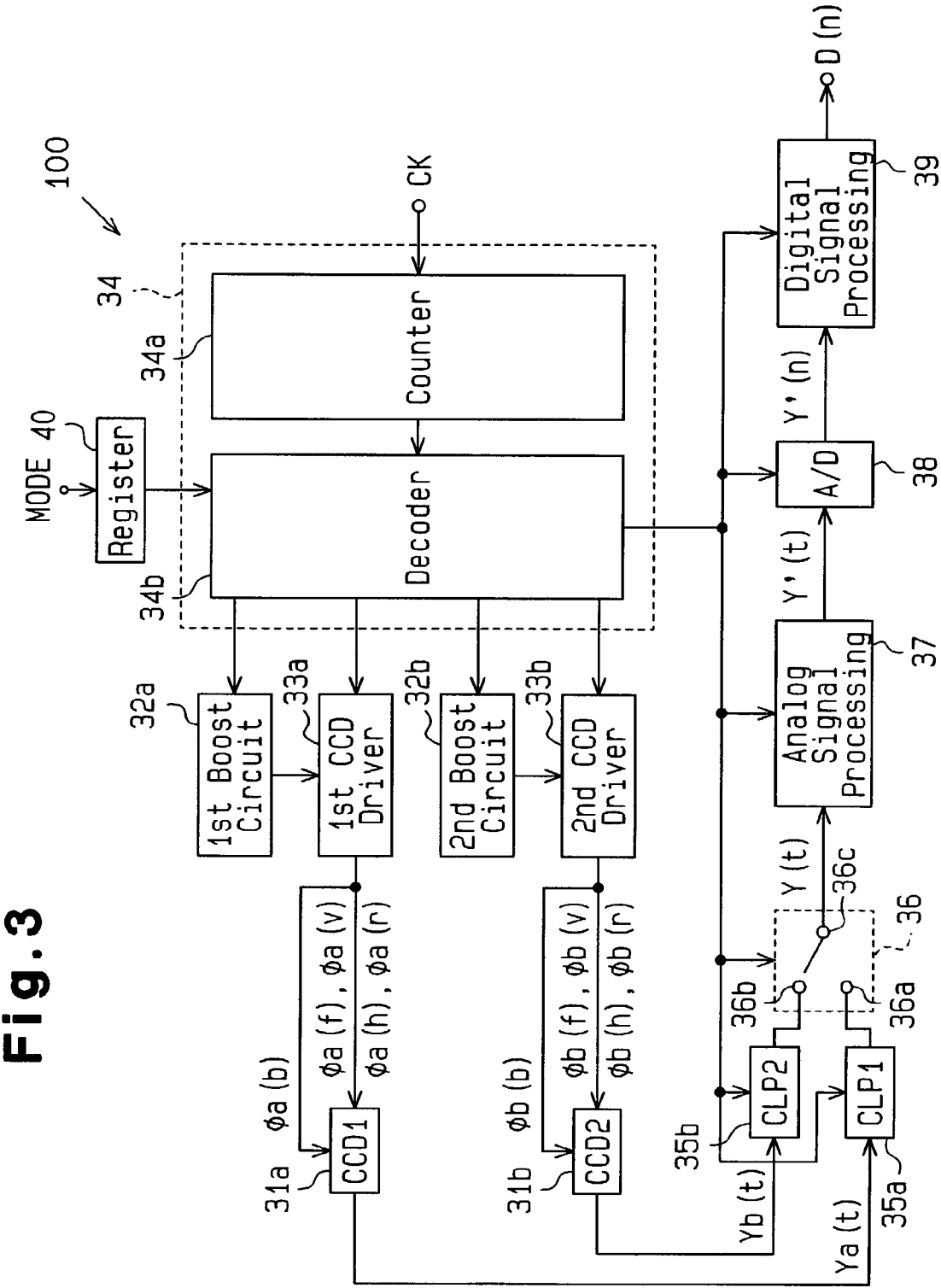
FIG. 3 is a schematic block diagram of an imaging apparatus according to a first embodiment of the present invention.

FIG. 3 is a schematic block diagram of an imaging apparatus 100 according to a first embodiment of the present invention. The imaging apparatus 100 includes solid-state imagine devices, or first and second CCDs 31a, 31b, first and second boost circuits 32a, 32b, first and second CCD driver circuits 33a, 33b, a timing control circuit 34, first and second clamp circuits 35a, 35b, a selection circuit 36, an analog signal processing circuit 37, an A/D conversion circuit 38, and a digital signal processing circuit 39.

Figure 4:
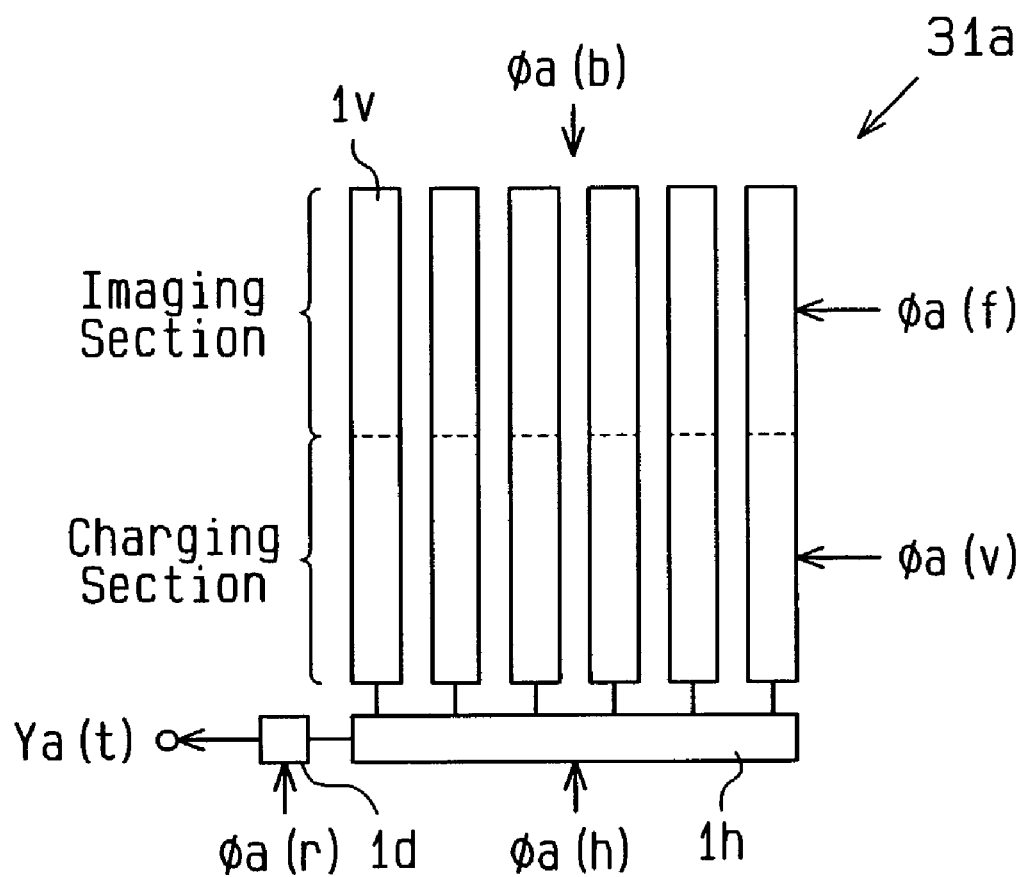
FIG. 4 is a schematic plan view showing a solid-state imaging device of the imaging apparatus of FIG. 3.

The first CCD 31a is, for example, a frame transfer solid-state imaging device such as that shown in FIG. 4. The first CCD 31a includes a plurality of vertical shift registers 1v extending continuously from an imaging section to a charging section, a horizontal shift register 1h arranged at the output side of the vertical shift registers 1v, and an output section 1d arranged at the output side of the horizontal shift registers 1h.

The vertical shift registers 1v are electrically separated and a plurality of light receiving pixels are formed in the imaging section. Information charges generated in accordance with a first subject image are accumulated in each light receiving pixel. In the imaging section, some of the lines of the vertical shift transistor define a so-called optical black (OPB) section, from which light is shut out. The information charges accumulated in each light receiving pixel is transferred to the charging section in accordance with a frame transfer clock signal øa(f) and a vertical transfer clock signal øa(v) at a high speed.

The information charges transferred to the charging section are temporarily accumulated in the charging section and then transferred to the horizontal shift register 1h in units of single lines in accordance with the vertical transfer clock signal øa(v). The information charges transferred to the horizontal shift register 1h are further transferred to the output section 1d in units of single pixels in accordance with a horizontal transfer clock signal øh.

The information charges transferred to the output section 1d are accumulated in a capacitor for each pixel and converted to a voltage corresponding to the charge amount to generate an image signal Ya(t), which has the converted voltage. In the output section 1d, the information charges accumulated in the capacitors are discharged to a drain in response to a reset clock signal ør, which is synchronized with the horizontal transfer clock signal øh.

The first CCD 1a has a vertical overflow drain structure and discharges the information charges accumulated in the imaging section toward a substrate in accordance with a substrate clock signal øa(b). In the same manner as the first CCD 31a, the CCD 31b includes a matrix of light receiving pixels and accumulates information charges, which are generated in accordance with a second subject image, in the light receiving pixels. The second CCD 31b generates a second image signal Yb(t) in accordance with accumulated information charges. The second CCD 1b also has a vertical overflow drain structure.

The first boost circuit 32a is arranged in association with the first CCD 31a and boosts input power supply voltage Vd (not shown) to generate a boosted voltage and supply the boosted voltage to the first CCD driver circuit 33a. The second boost circuit 32b is arranged in association with the second CCD 31b and boosts the power supply voltage Vd to generate a boosted voltage and supply the boosted voltage to the second CCD driver circuit 33b in the same manner as in the first boost circuit 32a.

In accordance with a timing signal provided from the timing control circuit 34, the first CCD driver circuit 33a generates and provides the first CCD 31a with the first frame transfer clock signal øa(f), the first vertical transfer clock signal øa(v), the first horizontal transfer clock signal øa(h), the first reset clock signal øa(r), and the first substrate clock signal øa(b). Further, in accordance with a timing signal provided from the timing control circuit 34, the second CCD driver circuit 33b generates and provides the second CCD 31b with the second frame transfer clock signal øb(f), the second vertical transfer clock signal øb(v), the second horizontal transfer clock signal øb(h), the second reset clock signal øb(r), and the second substrate clock signal øb(b). Accordingly, the first and second CCDs 31a, 31b are simultaneously driven.

The timing control circuit 34 includes a plurality of counters 34a, which count a reference clock signal CK having a fixed cycle, and a decoder 34b, which decodes the output of the counter 34a. A variety of timing signals are generated by changing a set value of the decoder 34b. The timing control circuit 34 is used by both first and second CCD driver circuits 33a, 33b.

The timing control circuit 34 receives one of a plurality of pieces of set data respectively associated with one of multiple display modes, examples of which are shown in FIGS. 5A to 5D. Then, the timing control circuit 34 changes the set value of the decoder 34b in accordance with the received set data. This varies the initiation timing for providing each clock pulse and the timing of the leading edge of each clock pulse. For example, in the case of FIG. 5B, the associated set data is provided to the decoder 34b. Then, the clock pulse provided to the first CCD driver circuit 33a and the clock pulse provided to the second driver circuit 33b are generated so that the phases of the clock pulses are offset from each other. The clock pulses are further provided to the first and second CCDs 31a, 31b. The first and second CCDs 31a, 31b generate the corresponding first image signal Ya(t) and the second image signal Yb(t) in a time-division manner.

The register 40 stores pieces of set data associated with the display modes. The register 40 receives a display mode switching signal MODE from an external device and provides the set data associated with the display mode designated by the switching signal MODE to the timing control circuit 34. The initiation timing for providing each clock pulse or the timing of the leading edge of each clock pulse is varied in accordance with the designated display mode.

The first clamp circuit 35a, which is connected to the first CCD 31a, clamps the first image signal Ya(t) and fixes the black level of the first image signal Ya(t). The first clamp circuit 35a provides the fixed first image signal Ya(t) to the selection circuit 36. The second clamp circuit 35b, which is connected to the second CCD 31b, clamps the second image signal Yb(t) and fixes the black level of the second image signal Yb(t). The second clamp circuit 35b provides the fixed second image signal Yb(t) to the selection circuit 36. The first and second clamp circuits 35a, 35b, which have the same clamp level, fixes the black level of the first and second image signals Ya(t), Yb(t) at the same voltage level.

The selection circuit 36 has two input terminals 36a, 36b and one output terminal 36c. The selection circuit 36 receives the clamped first and second image signals Ya(t), Yb(t) and provides one of the first and second image signals Ya(t), Yb(t) to the analog signal processing circuit 37. The selection circuit 36 operates in accordance with a timing signal provided from the timing control circuit 34 and connects the input terminal 36a and the output terminal 36c when the first image signal Ya(t) is output from the first CCD 31a. Further, the selection circuit 36 connects the input terminal 36b and the output terminal 36c when the second image signal Yb(t) is output from the second CCD 31b. Thus, the selection circuit 36 selectively receives image signals of two systems that are provided from the first and second CCDs 31a, 31b in a time-division manner to substantially generate an image signal of one system.

The analog signal processing circuit 37 receives the single system image signal Y(t) from the selection circuit 36 and performs analog signal processing, such as the CDS process and the AGC process, to generate the image signal Y'(t). The A/D conversion circuit 38 receives the image signal Y'(t), converts the image signal Y'(t) to a digital signal, and generates image data Y'(n).

The digital signal processing circuit 39 receives the image data Y'(n), and performs processing, such as color separation and matrix operation, on the image data Y'(n), to generate image data D(n), which includes luminance data and chrominance data. The digital signal processing circuit 39 includes an exposure controller, a white balance controller, and an integral calculator. The digital signal processing circuit 39 integrates image data at predetermined intervals and performs exposure control and white balance correction in accordance with the integrated value. The analog signal processing circuit 37, the A/D conversion circuit 38 and the digital signal processing circuit 39 are controlled by the timing control circuit 34 so that they process the first and second image signals Ya(t), Yb(t) separately in a time-division manner.

In the first embodiment, the first and second CCDs 31a, 31b are respectively provided with the first and second CCD driver circuits 33a, 33b and the first and second clamp circuits 35a, 35b but use the same analog signal processing circuit 37, the A/D conversion circuit 38, and the digital signal processing circuit 39. Thus, the circuit scale of the imaging apparatus 100 is reduced although it maintains the same capacity.

In the imaging apparatus 100, the first and second CCDs 31a, 31b, which are driven simultaneously, provide the first and second image signals Ya(t), Yb(t) to the first and second clamp circuits 35a, 35b in a time-division manner. The selection circuit 36 operates in accordance with the output timing of the first and second image signals Ya(t), Yb(t) and efficiently switches between the first and second image signals Ya(t), Yb(t).

By using the same analog signal processing circuit 37, A/D conversion circuit 38, and digital signal processing circuit 39 subsequent to the selection circuit 36, the circuit scale of the imaging apparatus 100 is effectively reduced. Further, since the first and second CCDs 31a, 31b use the same timing control circuit 34, the circuit scale is further reduced.

In the imaging apparatus 100, the first and second CCDs 31a, 31b are respectively provided with the first and second clamp circuits 35a, 35b. Thus, even if there is a difference in the black level of the first and image signals Ya(t), Yb(t) due to manufacturing differences between the first and second CCDs 31a, 31b, the first and second image signals Ya(t), Yb(t) are provided to the selection circuit 36 after the level difference is corrected. This suppresses differences in the contrasts of the two image signals respectively obtained from the first and second CCDs 31a, 31b and prevents the quality of the two images from differing from each other.

FIG. 6 is a timing chart illustrating the operation of the imaging apparatus 100. In the display mode of FIG. 5A, the first image A is mainly shown on the image display screen and the second image B is shown in a miniaturized state in the lower left quarter of the image display screen. In the following description, the imaging sections of the first and second CCDs 31a, 31b have 12 lines.

At timings t0 to t1 in FIG. 6, the first frame transfer clock signal øa(f) and the first vertical transfer clock signal øa(v) are generated during a blanking period of the vertical synchronizing signal VD. Then, information charges corresponding to a signal image display screen and accumulated in the imaging section of the first CCD 31a are transferred to the charge section. A timings t1 to t2, the second frame transfer clock signal øb(f) and the second vertical transfer clock signal øb(v) are generated. Then, information charges accumulated in the imaging section of the second CCD 31b are transferred to the charge section. The frame shift timing of the first CCD 31a and that of the second CCD 31b are offset from each other to decrease the peak value of rush current when frame shifting starts. During frame shifting, the information charges accumulated in the imaging section are transferred to the charge section at a high speed. Thus, excessive rush current flows when frame shifting starts. The first and second CCDs 31a, 31b do not simultaneously start the frame shifting. This decreases the peak value of the rush current.

At timing t3, which is synchronized with the horizontal synchronizing signal HD, the clocking of the first vertical transfer clock signal øa(v) starts. This sequentially transfers the information charges, which correspond to a single image display screen and which were transferred to the charging portion of the first CCD 31a, to the horizontal transfer section in units of single lines. The first image signal Ya(t) is sequentially generated in accordance with the information charges transferred to the horizontal transfer section and provided to the first clamp circuit 35a. The generation of the first image signal Ya(t) continues until timing t5, and image signals of the six lines corresponding to the upper half of a single image display screen are generated. At timings t3 to t5, the supply of power to the second CCD driver circuit 33b is stopped. This fixes the second vertical transfer clock øb(v) at the low level. Thus, the second CCD 31b does not provide the second clamp circuit 35b with the second image signal Yb(t).

At timing t4, the first substrate clock signal øa(b) goes high, and the information charges accumulated in the imaging section of the first CCD 31a is discharged to the substrate side. The information charges are accumulated in the imaging section during period La until the next frame shift timing. At timing t6, the second substrate clock signal øb(b) goes high, and information charges are accumulated in the imaging section of the second CCD 31b during period Lb until the next frame shift timing.

At timing t5, when the first CCD 31a completes providing the first clamp circuit 35a with image signals corresponding to six lines, the cycle of the first vertical transfer clock signal øa(v) is changed to two times. In accordance with the two times greater cycle of the first vertical transfer clock signal øa(v), the generation of the second vertical transfer clock signal øb(v) starts. The first and second vertical transfer clocks øa(v), øb(v) are generated during timings t5 to t7.

Referring to FIG. 6, at timings t5 to t7, the first and second vertical transfer clock signals øa(v), øb(v) go high alternately. As a result, the first and second CCDs 31a, 31b alternately provide the first and second image signals Ya(t), Yb(t) in single line units to the first and second clamp circuits 35a, 35b. Since the display section is the vertical half of the image display screen, the second image signal Yb(t) thins out every other line in the 12 lines, and the second image signal Yb(t) of the six lines are provided to the second clamp circuit 35b.

At timings t5 to t7, in response to the output timing of the first and second image signals Ya(t), Yb(t), the selection circuit 36 selectively receives the first and second image signals Ya(t), Yb(t) and generates the image signal Y(t). In this manner, the output timing of the first and second image signals Ya(t), Yb(t) are controlled to operate the selection circuit 36 in accordance with the output timing and generate the image signal Y(t) in an order that corresponds to the designated display mode.

Figure 7:
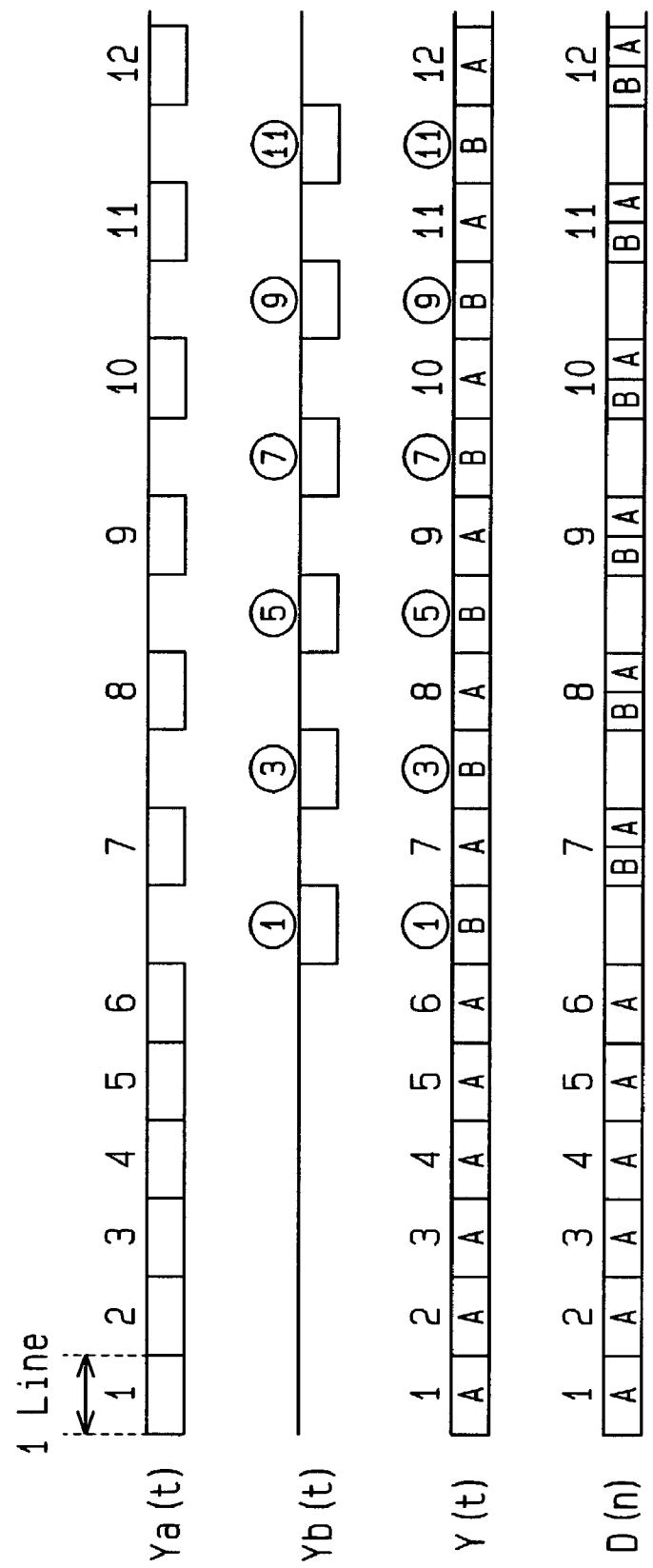
FIG. 7 is a timing chart illustrating part of FIG. 6 and image data D(n)

FIG. 7 is a timing chart of the first image signal Ya(t), the second image signal Yb(t), the image signal Y(t), and the image data D(n), which are generated at the timings illustrated in FIG. 6.

As illustrated in FIG. 6, the first image signal Ya(t) is continuously and sequentially generated in single line units until the sixth line. Subsequently, from the seventh line, the first image signal Ya(t) is generated alternately to the second image signal Yb(t) at different timings. After the output of the first image signal Ya(t) corresponding to six lines is completed, the output of the second image signal Yb(t) starts.

The image signal Y(t) output from the selection circuit 36 is the first image signal Y(a)t until the sixth line. From the seventh line, the image signal Y(t) includes the first image signal Ya(t) and the second image signal Yb(t) that alternate in single line units. Until the sixth line of the first image signal Ya(t) is output, the selection circuit 36 selects the first CCD 31a and provides the analog signal processing circuit 37 with the first image signal Ya(t) until the sixth line as the image signal Y(t). Subsequently, the selection circuit 36 alternately selects the first CCD 31a side and the second CCD 31b side. The image signal Y(t), to which the first and second image signals Ya(t), Yb(t) are alternately allocated, is provided to the analog signal processing circuit 37 so that the signal of the seventh line of the first image signal Ya(t) is selected after the signal of the first line of the second image signal Yb(t) and then the signal of the third line of the second image signal Yb(t) is selected. As a result, the first image signal Ya(t) and the second image signal Yb(t) are substantially synthesized subsequent to the seventh line of the image signal Y(t).

The digital signal processing circuit 39 sequentially processes up to the sixth line of the image signal Y(t) (i.e., the sixth line of the first image signal Ya(t)) and provides the processed image signal Y(t) as image data D(n) to an external device. Subsequent to the seventh line, the image data corresponding to a single line of the second image signal Yb(t) is compressed to half the data of a single line by a compression circuit, which is incorporated in the digital signal processing circuit 39. Further, subsequent to the seventh line, the former half of the data of a single line that does not correspond to a single line of the first image signal Ya(t) is eliminated. The compressed image data and the data including only the latter half of a single line is synthesized to generate image data D(n) corresponding to a single line. For example, the data of the seventh line of the image data D(n) is generated by synthesizing data that is compressed in half of a single line and generated from the first line of the second image signal with data including the latter half of a single line of the image data generated from the seventh line of the first image signal Ya(t). Thus, the image display screen simultaneously shows two images. The second image B, which is generated by the second CCD 31b, is shown in the lower left quarter of the first image A, which is generated by the first CCD 31a.

Figure 5A:
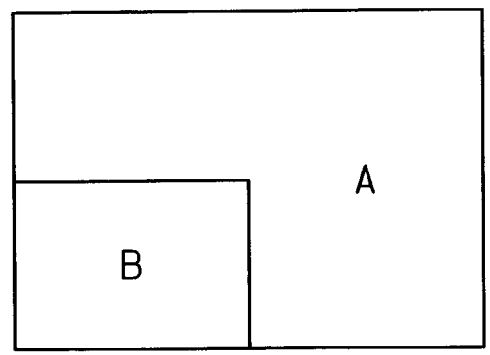
FIGS. 5A to 5D are schematic diagrams showing display mode examples of the imaging device of FIG. 3.
Figure 5B:
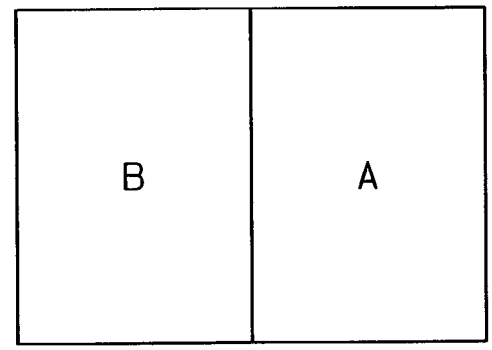
Figure 5C:
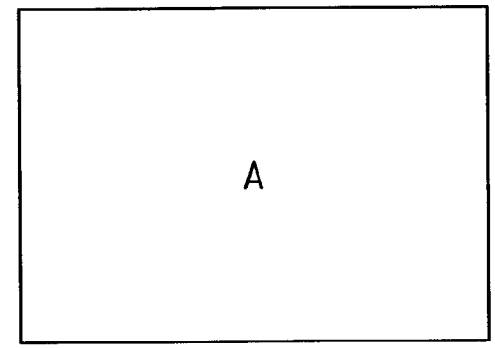
Figure 5D:
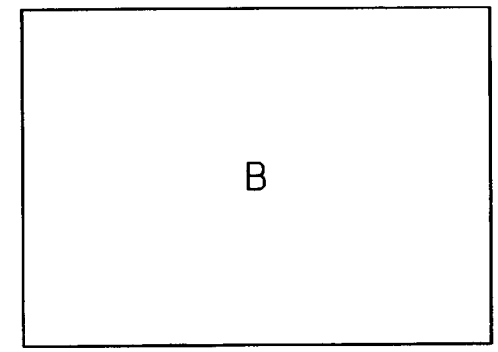

The output of the first image signal Ya(t) and the output of the second image signal Yb(t) are switched and a compressing process and a synthesizing process are performed accordingly to switch the display mode of the reproduced image on the image display screen. By controlling the output of each image signal of the first and second image signals Ya(t), Yb(t) in accordance with the associated display section, image data corresponding to the designated display mode is generated without using the frame memory. For example, to display the first and second images A, B respectively on the left and right halves of the image display screen as shown in FIG. 5B, the first and second CCDs 31a, 31b are driven so that the first and second image signals Ya(t), Yb(t) are alternately output. When showing either one of the first image A and the second image B as shown in FIGS. 5C and 5D, either one of the first CCD 31a and the second CCD 31b is driven in accordance with the desired display.

Figure 8:
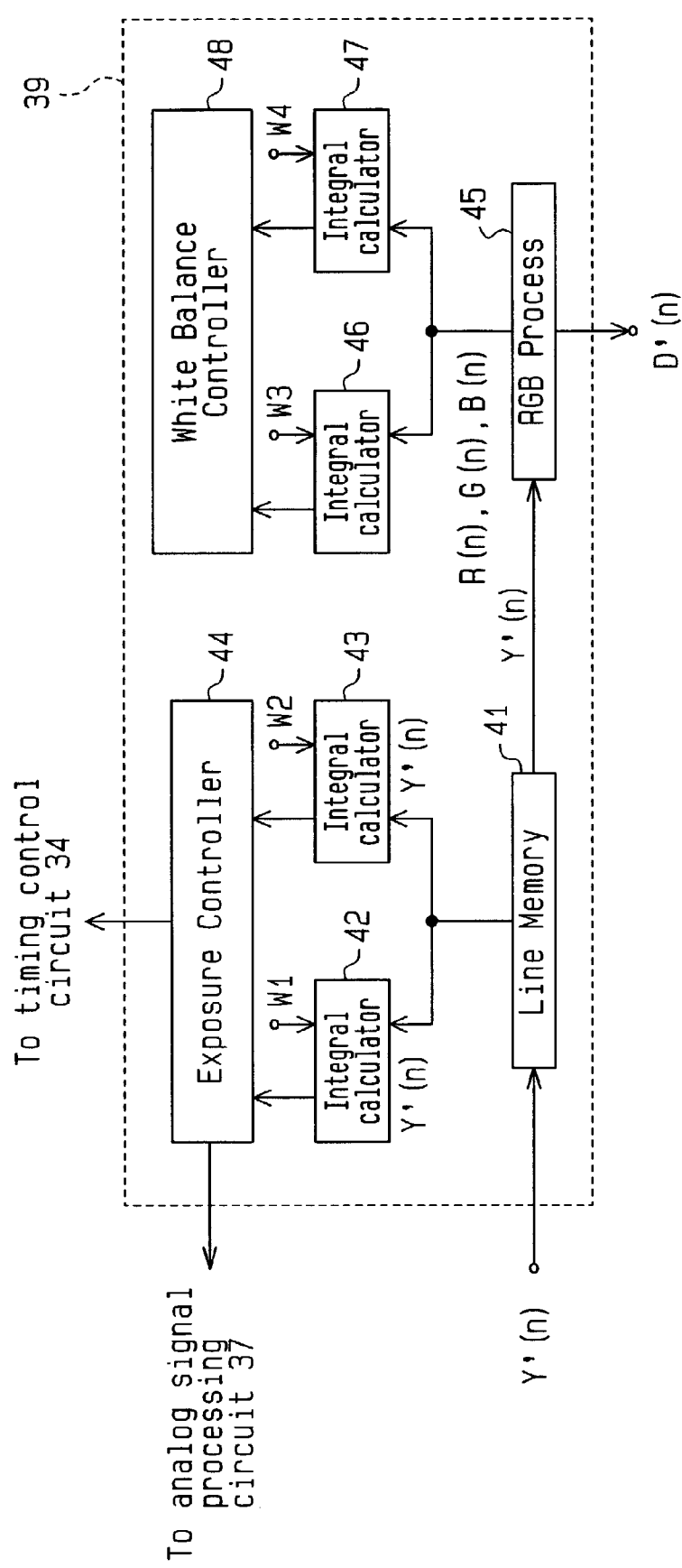
FIG. 8 is a schematic block diagram of a digital signal processing circuit of the imaging apparatus of FIG. 3.
Figure 9:
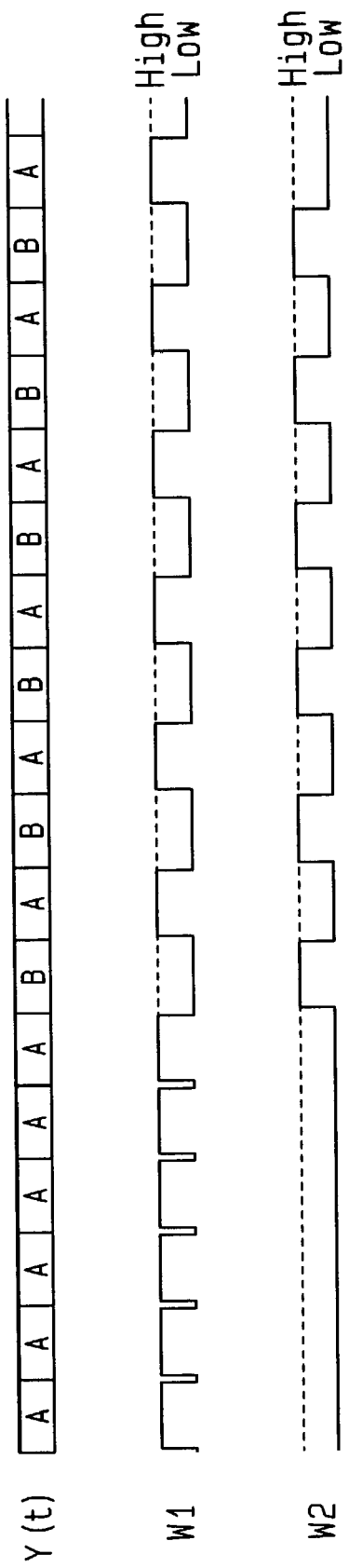
FIG. 9 is a timing chart illustrating first and second integrated control signals of the digital signal processing circuit of FIG. 8.

FIG. 8 is a block diagram illustrating the configuration of the digital signal processing circuit 39. The digital signal processing circuit 39 includes a line memory 41, a first integral calculator 42, a second integral calculator 43, an exposure controller 44, an RGB process circuit 45, a third integral calculator 46, a fourth integral calculator 47, and a white balance controller 48.

The line memory 41 stores an appropriate number of lines of the image data Y'(n), provided from the A/D converter circuit 38 in single line units and provides the image data Y'(n), to the first and second integral calculators 42, 43 after holding the image data Y'(n), during a single horizontal scan period. The first and second integral calculators 42, 43 receive the image data Y'(n), and integrates the image data Y'(n), during a period corresponding to, for example, the central section of a single image display screen.

The first and second integral calculators 42, 43 are operated in accordance with first and second integration control signals W1, W2, which are provided from the timing control circuit 34, and the first and second control signals W1, W2 control the integration periods. For example, when the data output from the line memory 41 is the data generated from the first image signal Ya(t), the first integration control signal W1 goes high in accordance with the period during which the data is output. Thus, the first integral calculator 42, which receives the first integration control signal W1, performs an integration process on the image data generated from the first image signal Ya(t). On the other hand, when the data output from the line memory 41 is generated from the second image signal Yb(t), the second integration control signal W2 goes high in accordance with the period during which the data is output. Thus, the second integral calculator 43 performs an integration process on the image data generated from the second image signal Yb(t). The first integral calculator 42 and the second integral calculator 43 separately perform an integration process on the image data.

The exposure controller 44 is used commonly by the first and second integral calculators 42, 43. The exposure controller 44 controls the exposure state of the first and second CCDs 31a, 31b in a time-division manner in accordance with the output from the first and second integral calculators 42, 43. The exposure controller 44 controls the reduction and prolonging of the accumulation time of the first CCD 31a in accordance with the integration data output from the first integral calculator 42. Further, the exposure controller 44 controls the reduction and prolonging of the accumulation time of the second CCD 31b in accordance with the integration data output from the second integral calculator 43. For example, to control the exposure state of the first CCD 31a, when the integrated value of the image data generated from the first image signal is greater than an appropriate range, the exposure controller 44 instructs the timing control circuit 34 to shorten the accumulation time of the first CCD 31a. On the other hand, when the integrated value of the image data generated from the first image signal is less than the appropriate range, the exposure controller 44 instructs the timing control circuit 34 to prolong the accumulation time of the first CCD 31a. Thus, feedback control is performed so that the exposure state of the first CCD 31a is always appropriate.

The RGB process circuit 45 performs processing, such as color separation and a matrix operation, on the image data Y'(n), to generate image data D(n), which includes luminance data and chrominance data. For example, during the color separation process, the image data Y'(n), is separated in accordance with the color arrangement of the color filter, which is attached to the imaging section of the first and second CCDs 31a, 31b, to generate plural pieces of color component data R(n), G(n), B(n). In the matrix operation, the separated color components are synthesized to generate luminance data and chrominance data, which is obtained by subtracting the luminance data from each piece of color component data. The RGB process circuit 45 incorporates a compressing circuit and a synthesizing circuit and performs a compression process on specific pieces of image data when necessary. The RGB process circuit 45 also synthesizes the image data obtained from the first CCD 31a with the image data obtained from the second CCD 31b.

The third and fourth integral calculators 46, 47 receive the color components R(n), G(n), B(n) provided from the RGB process circuit 45 and integrates, for example, each piece of color component data in units of one to several image screen displays. The third and fourth integral calculators 46, 47 are operated in accordance with the output timing of the first and second image signals Ya(t), Yb(t) or the third and fourth integration control signals W3, W4 generated in accordance with the output order. The third and fourth integral calculators 46, 47 independently integrate the color component data R(n), G(n), B(n) generated from the first image signal Ya(t) and the color component data R(n), G(n), B(n) generated from the second image signal Yb(t).

The white balance controller 48, which is used commonly by the third and fourth integral calculators 46, 47, performs the white balance corrections of the image data generated from the first and second image signals Ya(t), Yb(t) independently in a time-division manner based on the integration data output from the two integral calculators 46, 47. During the correction of the white balance, for example, when correcting the white balance of the image data generated from the first image signal Ya(t), the integrated values of the color component data R(n), G(n), B(n) output from the third integral calculator are compared and the integrated values are multiplied by a coefficient, which is inherent to the color component signals R(n), B(n).

Plural integral calculators are provided in association with each of the first and second image signals Ya(t), Yb(t), and an integration process is performed in each integral calculator in accordance with the output timing of the first and second image signals Ya(t), Yb(t). This independently performs the integration of the image data, which is generated from the first and second image signals Ya(t), Yb(t). Further, by using the same exposure controller 44 or the same white balance controller 48 for the integral calculators, the circuit scale of the digital signal processing circuit 39 is minimized.

The imaging apparatus 100 of the first embodiment has the advantages described below.

(1) The analog signal processing circuit 37, the A/D conversion circuit 38, and the digital signal processing circuit 39, which are downstream to the selection circuit 36, are used commonly to effectively reduce the circuit scale of the imaging apparatus. Further, the timing control circuit 34 is commonly used by the first and second CCDs 31a, 31b. This further reduces the circuit scale.

(2) The first and second clamp circuits 35a, 35b are respectively provided for the first and second CCDs 31a, 31b. This suppresses differences between the contrasts of the two images respectively obtained from the first and second CCDs 31a, 31b and prevents the qualities of the two images from differing from each other.

[Second Embodiment]

Figure 10:
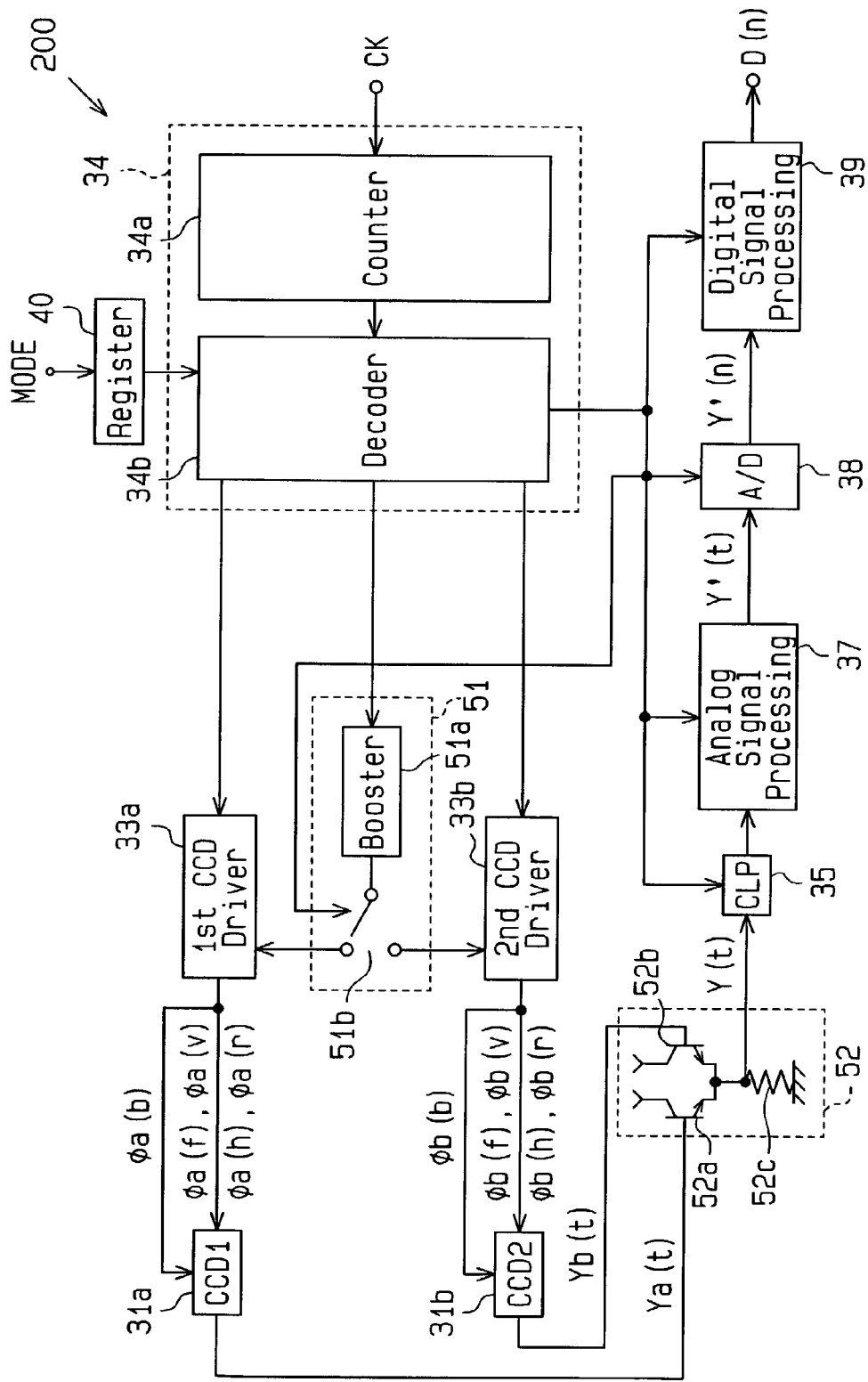
FIG. 10 is a schematic block diagram of an imaging apparatus according to a second embodiment of the present invention.

FIG. 10 is a schematic block diagram of an imaging apparatus 200 according to a second embodiment of the present invention. The first embodiment differs from the second embodiment in that the boost circuit 51 and the clamp circuit 35 are used commonly.

The boost circuit 51 includes a booster 51a and an output selector 51b. The booster 51a generates boosts the power supply voltage Vd (not shown) to generate boosted voltage. The output selector 51b switches the subject supplied with the boosted voltage in accordance with the operating timing of the first and second CCDs 31a, 31b.

When the boost circuit 51 drives the first CCD 31a, the boost circuit 51 supplies the boosted voltage to the first CCD 31a and the first CCD driver circuit 33a. When the boost circuit 51 drives the second CCD 31a, the boost circuit 51 supplies the boosted voltage to the second CCD 31b and the second CCD driver circuit 33b. The switching of the output selector 51b is controlled by the timing signal from the timing control circuit 34 and is synchronized with the switching of the digital signal processing circuit 39.

The selection circuit 52 includes parallel-connected first and second transistors 52a, 52b and a resistor 52c. One terminal of the resistor 52c is grounded. The first and second transistors 52a, 52b are connected between the power supply Vd and the other end of the resistor 52c. The first and second transistors 52a, 52b are, for example, bipolar resistors. The first CCD 31a is connected to the base of the first transistor 52a, and the second CCD 31b is connected to the base of the second transistor 52b. The selection circuit 52 impedance-converts the image signal from the operating one of the first and second CCDs 31a, 31b, and provides the impedance-converted image signal Y(t) to the clamp circuit 35.

In the imaging apparatus 200, for example, when driving the first CCD 31a, the output selector 51b selects the first CCD driver circuit 33a side and supplies the boosted voltage to the first CCD driver circuit 33a. The first CCD 31a generates the first image signal Ya(t) and supplies the selection circuit 52 with the first image signal Ya(t). In accordance with the first image signal Ya(t), the first transistor 52a is activated and the first image signal Ya(t) is converted to the image signal Y(t). The image signal Y(t) is provided to the clamp circuit 35. When driving the second CCD 31b, the boosted voltage is supplied to the second CCD driver circuit 33b side and the second transistor 52b is activated. This provides the clamp circuit 35 with the second image signal Yb(t) as the image signal Y(t).

In addition to the advantages of the first embodiment, the imaging apparatus 200 of the second embodiment has the advantages described below.

(1) The boost circuit 51 and the clamp circuit 35 are used commonly. This simplifies the circuit configuration of the imaging apparatus 100 and significantly reduces the circuit scale in comparison to the conventional imaging apparatus.

(2) The single boost circuit 51 are operated to drive the first and second CCDs 31a, 31b. This reduces power consumption. The second embodiment is especially effective for an imaging apparatus driven by a battery.

[Third Embodiment]

Figure 11:
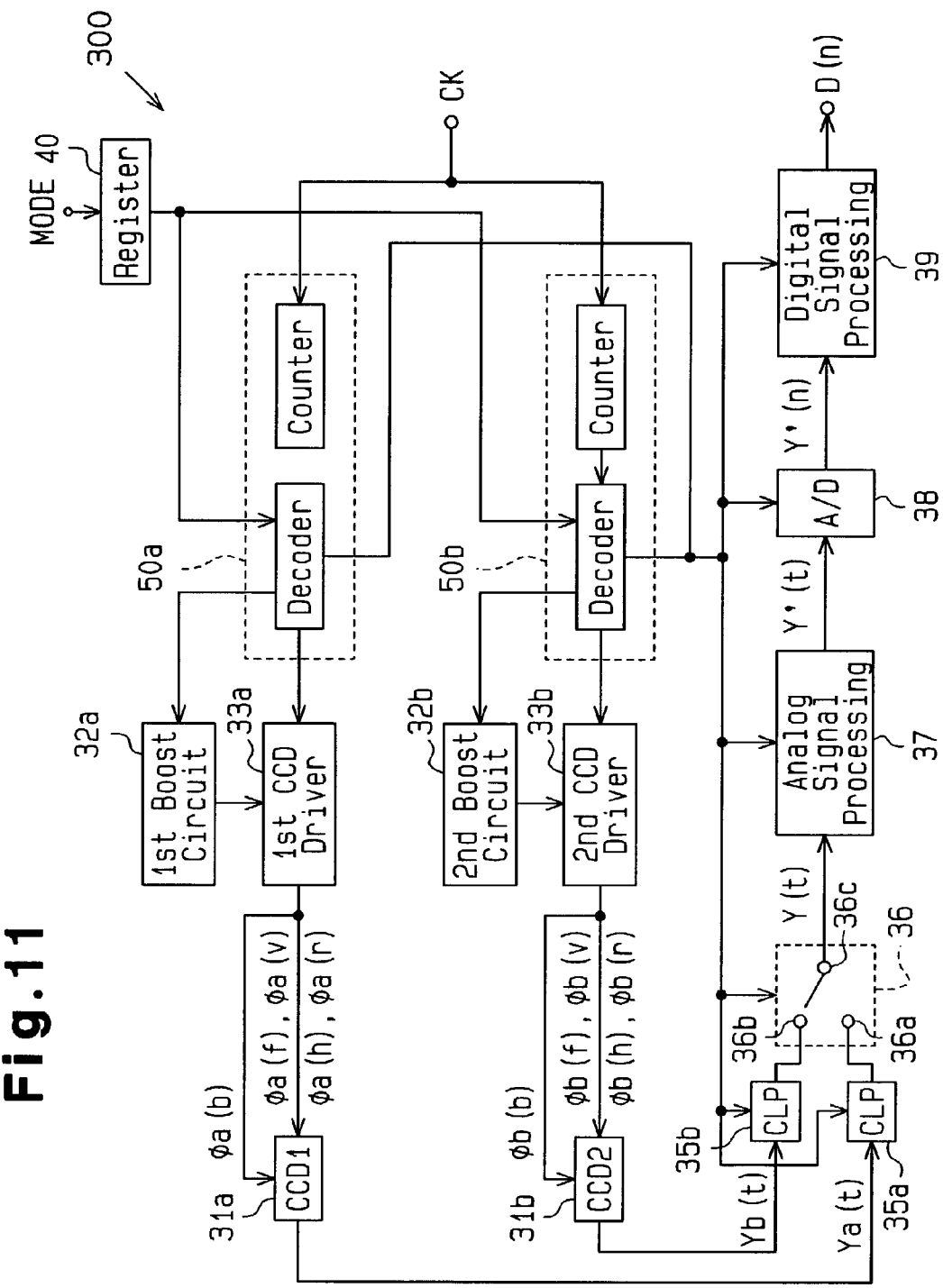
FIG. 11 is a schematic block diagram of an imaging apparatus according to a third embodiment of the present invention.

FIG. 11 is a schematic block diagram of an imaging apparatus 300 according to a third embodiment of the present invention. The third embodiment differs from the first embodiment in that a timing control circuit is provided for each of the first and second CCDs 31a, 31b.

First and second timing control circuits 50a, 50b are provided in association with the first and second CCDs 31a, 31b, respectively, and operated independently from each other. The first and second timing control circuits 50a, 50b have the same configuration and each include a counter, which counts a reference clock signal CK having a fixed cycle, and a decoder, which decodes the output of the counter. The first and second timing control circuits 50a, 50b generate a variety of timing signals by changing the set value of the decoder.

In the imaging apparatus 300, when, for example, driving the first CCD 31a, the timing signal generated by the first timing control circuit 50a is provided to the first CCD driver circuit 33a. In accordance with the provided timing signal, the first CCD driver circuit 33a generates the first frame transfer clock signal øa(f), the first vertical transfer clock signal øa(v), the first horizontal transfer clock signal øa(h), and the first reset clock signal øa(r). The first CCD 31a generates the first image signal Ya(t) and provides the first image signal Ya(t) to the first clamp circuit 35a. In this state, the second timing control circuit 50b stops the output of the timing signal. Thus, the second CCD driver circuit 33b and the second CCD 31b do not operate.

The analog signal processing circuit 37 and the digital signal processing circuit 39 are controlled by a timing signal from the operating timing control circuit.

The imaging apparatus 300 of the third embodiment has the advantages described below.

(1) By providing the timing control circuits 50a, 50b with the first and second CCDs 31a, 31b, respectively, different clock pulses are generated in accordance with the specification of each solid-state imaging device. Accordingly, even if the first and second CCDs 31a, 31b are solid-state imaging devices operated by clock pulses having different clock pulses, the same operations as the first embodiment are performed.

(2) The first and second boost circuits 32a, 32b are provided with the first and second CCDs 31a, 31b, respectively. Thus, even if the operating voltages of the first and second CCDs 31a, 31b differ from each other, the first and second CCDs 31a, 31b are effectively operated.

[Fourth Embodiment]

Figure 12:
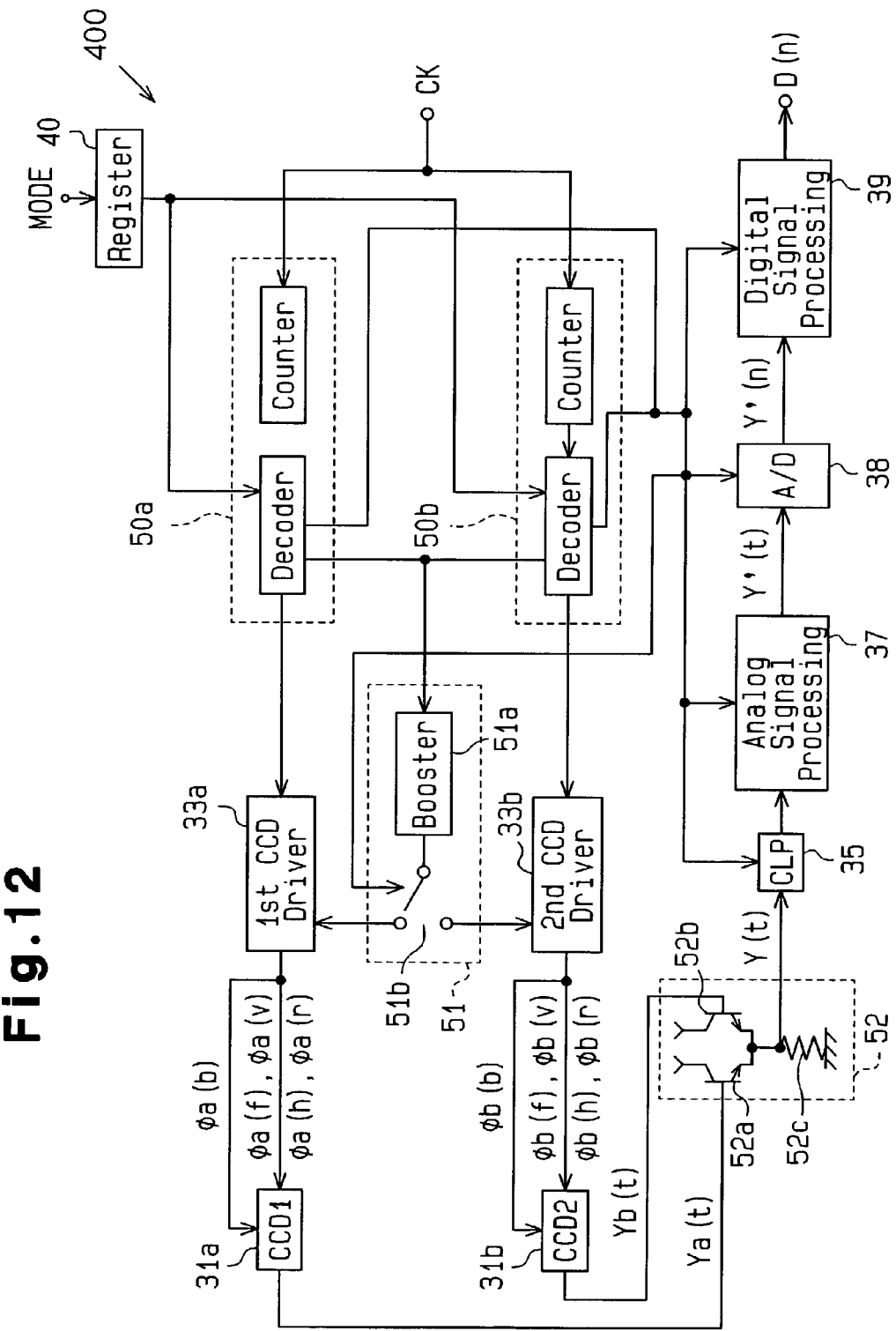
FIG. 12 is a schematic block diagram of an imaging apparatus according to a fourth embodiment of the present invention.

FIG. 12 is a schematic block diagram of an imaging apparatus 400 according to a fourth embodiment of the present invention. The fourth embodiment differs from the third embodiment in that a boost circuit 51 and a clamp circuit 35 are further commonly used in the same manner as the imaging apparatus 200 of the second embodiment.

In the imaging apparatus 400, for example, when driving the first CCD 31a, the timing signal generated by the first timing control circuit 50a is provided to the first CCD driver circuit 33a. Further, the output selector 51b selects the first CCD driver circuit 33a side and supplies the boosted voltage to the first CCD driver circuit 33a. The first CCD 31a generates the first image signal Ya(t), and the first image signal Ya(t) is provided to the first transistor 52a of the selection circuit 52. The first transistor 52a is activated in accordance with the first image signal and converts the first image signal Ya(t) to the image signal Y(t). The image signal Y(t) is provided to the clamp circuit 35.

In addition to the advantages of the third embodiment, the imaging apparatus 400 of the fourth embodiment has the following advantages.

(1) The circuit configuration is more simplified and the circuit scale is further reduced in comparison with the imaging apparatus 300 of the third embodiment.

(2) The single boost circuit 51 is operated to drive the first and second CCDs 31a, 31b. Thus, the power consumption is lower than that of the imaging apparatus 300.

It should be apparent to those skilled in the art that the present invention may be embodied in many other specific forms without departing from the spirit or scope of the invention. Particularly, it should be understood that the present invention may be embodied in the following forms.

In the first embodiment, the first and second solid-state imaging devices (CCD) 31a, 31b do not have to have the same configuration. For example, if the driving conditions are the same, a color imaging CCD and a monochrome imaging CCD may be used together. Alternatively, CCDs having different configurations may be used. When using a color imaging CCD together with a monochrome imaging CCD, a signal processing circuit applicable to both color and monochrome imaging CCDs is employed.

In the first embodiment, only the boost circuit may be used commonly. Alternatively, only the clamp circuit may be used commonly.

In each of the illustrated embodiments, the first and second CCDs 31a, 31b may be a frame interline solid-state imagine device including a charging section that temporarily holds information charges corresponding to a single image display screen.

In each of the illustrated embodiments, the set of the first and second integral calculators 42, 43 and the set of the third and fourth integral calculators 46, 47 may be replaced by a single integral calculator if, for example, the operations of the first and second CCDs 31a, 31b are switched in units of plural image screen displays.

An application example of the present invention will now be discussed.

It is desired that a solid-state imaging device used in a camera monitor system have an extremely wide dynamic range and a high light receiving sensitivity. To achieve the wide dynamic range and the high light receiving sensitivity with a single sold-state imaging device, a solid-state imaging device, which has a high light receiving sensitivity to enable the generation of images in the dark such as during nighttime, and infrared light may be employed. In this case, an infrared cut filter is set on a light receiving surface of the solid-state imaging device when generating an image at a bright location, such as during daytime. In addition to such structure, a mechanism for controlling the infrared light or for controlling the opening and closing of the infrared light becomes necessary. This causes the entire system to be complicated. Thus, even though there is only one solid-state imaging device, the scale of the camera system increases and costs increases.

Accordingly, among the first and second solid-state imaging devices of the present invention, the second solid-state imaging device is set as the solid-state imaging device having the high infrared sensitivity, and the first solid-state imaging device is set as a normal solid-state imaging device having an infrared sensitivity that is lower than that of the first solid-state imaging device. When generating an image at a bright location, only the first solid-state imaging device is driven. In a dark location, only the second solid-state imaging device is driven. It is preferred that the switching between the first and second solid-state imaging devices be performed automatically in accordance with the illumination of the imaging subject. When controlling light exposure, the illumination measured by a light measuring sensor and an integrated value of the image signal calculated by the signal processing circuit may be used.

In contrast with when using only one solid-state imaging device, the application of the present invention eliminates the need for an infrared light, the infrared cut filter, and a mechanism for controlling the infrared light and the infrared cut filter. This substantially reduces the system scale and decreases costs accordingly. Further, when two solid-state imaging devices are arranged, different lenses may be used for each solid-state imaging device in accordance with the imaging conditions.

A further application example of the present invention will now be discussed.

Cellular phones that incorporate cameras and may be used as portable digital cameras are known in the art. Such a camera also includes a function for transmitting an image via an Internet line. To use this function, a user must use the keys of the cellular phone to input an address that designates the transmission destination of the image. To simplify the address input, a bar code may be used to indicate an address. The cellular phone has a sensor used to read the bar code so that an address is instantaneously input.

Accordingly, a solid-state imaging device having more light receiving pixels than the first solid-state imaging device is used as the second solid-state imaging device of the present invention. When performing recognition of an image that requires high resolution, such as a bar code, the second solid-state imaging device having a high resolution is driven. When generating normal images, the first solid-state imaging device is driven. Such structure may also be used, for example, to sense finger prints for security purposes and generate normal images.

The present invention may be applied to the above camera monitor system, the bar code reading system, and the system finger print sensor. That is, the present invention is optimal when generating images of different conditions with a single system.

The present examples and embodiments are to be considered as illustrative and not restrictive, and the invention is not to be limited to the details given herein, but may be modified within the scope and equivalence of the appended claims.

What is claimed is:

1. An imaging apparatus comprising:
   a first solid-state imaging device including a matrix of first light receiving pixels, wherein each of the first light receiving pixels generates an information charge in accordance with a first imaging subject and accumulates the generated information charge;
   a second solid-state imaging device including a matrix of second light receiving pixels, wherein each of the second light receiving pixels generates an information charge in accordance with a second imaging subject and accumulates the generated information charge;
   a first drive circuit connected to the first solid-state imaging device, wherein the first drive circuit drives the first solid-state imaging device to generate a first image signal that corresponds to the information charge accumulated in each of the first light receiving pixels in accordance with a vertical scan timing and a horizontal scan timing;
   a second drive circuit connected to the second solid-state imaging device, wherein the second drive circuit drives the second solid-state imaging device to generate a second image signal that corresponds to the information charge accumulated in each of the second light receiving pixels in accordance with the vertical scan timing and the horizontal scan timing;
   a timing control circuit connected to the first and second drive circuits, wherein the timing control circuit determines the vertical and horizontal scan timing of the first and second solid-state imaging devices in accordance with a reference clock signal having a fixed cycle;
   a selection circuit connected to an output of each of the first and second solid-state imaging devices, wherein the selection circuit selects either one of the first and second image signals in synchronism with an operation timing of the first and second solid-state imaging devices; and
   a signal processing circuit connected to an output of the selection circuit, wherein the signal processing circuit performs a predetermined imaging process on the selected image signal to generate image data,
   wherein the selection circuit alternately selects the first and second image signals at predetermined time intervals.

2. The imaging apparatus according to claim 1, further comprising:
a first clamp circuit connected to the output of the first solid-state imaging device, wherein the first clamp circuit fixes the black level of the first image signal and provides the fixed first image signal to the selection circuit; and
a second clamp circuit connected to the output of the second solid-state imaging device, wherein the second clamp circuit fixes the black level of the second image signal and provides the fixed second image signal to the selection circuit, and wherein the first and second clamp circuits have the same clamp level.

3. The imaging apparatus according to claim 1, further comprising:
a clamp circuit connected to the output of the selection circuit, wherein the clamp circuit fixes the black level of the selected image signal and provides the fixed image signal to the signal processing circuit.

4. The imaging apparatus according to claim 1, further comprising:
a first boost circuit connected to the timing control circuit and the first drive circuit to boost a power supply voltage and generate a first boosted voltage and supply the first boosted voltage to the first drive circuit; and
a second boost circuit connected to the timing control circuit and the second drive circuit to boost the power supply voltage and generate a second boosted voltage and supply the second boosted voltage to the second drive circuit.

5. The imaging apparatus according to claim 1, further comprising:
a boost circuit connected to the timing control circuit and the first and second drive circuits to boost a power supply voltage and generate a boosted voltage, wherein the boost circuit includes:
a booster for generating the boosted voltage; and
an output selector for selectively supplying either one of the first and second drive circuits with the boosted voltage in synchronism with the operation timing of the first and second solid-state imaging devices.

6. The imaging apparatus according to claim 1, wherein the signal processing circuit includes:
a first integral calculator for receiving the first image signal and integrating the first image signal in a predetermined time to generate a first integration signal;
a second integral calculator for receiving the second image signal and integrating the second image signal in a predetermined time to generate a second integration signal; and
an exposure controller connected to the first and second integral calculators to independently control the exposure state of the first solid-state imaging device and the exposure state of the second solid-state imaging device in accordance with the first and second integration signals.

7. The imaging apparatus according to claim 6, wherein the signal processing circuit further includes:
a third integral calculator for receiving the first image signal and integrating the first image signal in a predetermined time to generate a third integration signal;
a fourth integral calculator for receiving the second image signal and integrating the second image signal in a predetermined time to generate a fourth integration signal; and
a white balance controller connected to the third and fourth integral calculators to independently correct the white balance of the first solid-state imaging device and the white balance of the second solid-state imaging device in accordance with the third and fourth integration signals.

8. The imaging apparatus according to claim 1, wherein the second solid state imaging device has an infrared sensitivity that is greater than that of the first solid-state imaging device, and wherein the timing control circuit operates the first and second drive circuits in accordance with the illumination of the imaging subject such that the first and second drive circuits alternately drive the first and second solid-state imaging devices at predetermined time intervals.

9. An imaging apparatus comprising:
a first solid-state imaging device including a matrix of first light receiving pixels, wherein each of the first light receiving pixels generates an information charge in accordance with a first imaging subject and accumulates the generated information charge;
a second solid-state imaging device including a matrix of second light receiving pixels, wherein each of the second light receiving pixels generates an information charge in accordance with a second imaging subject and accumulates the generated information charge;
a first drive circuit connected to the first solid-state imaging device, wherein the first drive circuit drives the first solid-state imaging device to generate a first image signal that corresponds to the information charge accumulated in each of the first light receiving pixels in accordance with a vertical scan timing and a horizontal scan timing;
a second drive circuit connected to the second solid-state imaging device, wherein the second drive circuit drives the second solid-state imaging device to generate a second image signal that corresponds to the information charge accumulated in each of the second light receiving pixels in accordance with the vertical scan timing and the horizontal scan timing;
a first timing control circuit connected to the first drive circuit, wherein the first timing control circuit determines the vertical and horizontal scan timing of the first solid-state imaging device in accordance with a reference clock signal having a fixed cycle;
a second timing control circuit connected to the second drive circuit, wherein the second timing control circuit determines the vertical and horizontal scan timing of the second solid-state imaging device in accordance with the reference clock signal having a fixed cycle;
a selection circuit connected to an output of each of the first and second solid-state imaging devices, wherein the selection circuit selects either one of the first and second image signals in synchronism with an operation timing of the first and second solid-state imaging devices; and
a signal processing circuit connected to an output of the selection circuit, wherein the signal processing circuit performs a predetermined imaging process on the selected image signal to generate image data,
wherein the selection circuit alternately selects the first and second image signals at predetermined time intervals.

10. The imaging apparatus according to claim 9, further comprising:
a first clamp circuit connected to the output of the first solid-state imaging device, wherein the first clamp circuit fixes the black level of the first image signal and provides the fixed first image signal to the selection circuit; and a second clamp circuit connected to the output of the second solid-state imaging device, wherein the second clamp circuit fixes the black level of the second image signal and provides the fixed second image signal to the selection circuit, and wherein the first and second clamp circuits have the same clamp level.

11. The imaging apparatus according to claim 9, further comprising:
a clamp circuit connected to the output of the selection circuit, wherein the clamp circuit fixes the black level of the selected image signal and provides the fixed image signal to the signal processing circuit.

12. The imaging apparatus according to claim 9, further comprising:
a first boost circuit connected to the first timing control circuit and the first drive circuit to boost a power supply voltage and generate a first boosted voltage and supply the first boosted voltage to the first drive circuit; and
a second boost circuit connected to the second timing control circuit and the second drive circuit to boost the power supply voltage and generate a second boosted voltage and supply the second boosted voltage to the second drive circuit.

13. The imaging apparatus according to claim 9, further comprising:
a boost circuit connected to the first and second timing control circuits and the first and second drive circuits to boost a power supply voltage and generate a boosted voltage, wherein the boost circuit includes;
a booster for generating the boosted voltage; and
an output selector for selectively supplying either one of the first and second drive circuits with the boosted voltage in synchronism with the operation timing of the first and second solid-state imaging devices.

14. The imaging apparatus according to claim 9, wherein the signal processing circuit includes:
a first integral calculator for receiving the first image signal and integrating the first image signal in a predetermined time to generate a first integration signal;
a second integral calculator for receiving the second image signal and integrating the second image signal in a predetermined time to generate a second integration signal; and
an exposure controller connected to the first and second integral calculators to independently control the exposure state of the first solid-state imaging device and the exposure state of the second solid-state imaging device in accordance with the first and second integration signals.

15. The imaging apparatus according to claim 14, wherein the signal processing circuit further includes:
a third integral calculator for receiving the first image signal and integrating the first image signal in a predetermined time to generate a third integration signal;
a fourth integral calculator for receiving the second image signal and integrating the second image signal in a predetermined time to generate a fourth integration signal; and
a white balance controller connected to the third and fourth integral calculators to independently correct the white balance of the first solid-state imaging device and the white balance of the second solid-state imaging device in accordance with the third and fourth integration signals.

16. The imaging apparatus according to claim 9, wherein the first solid-state imaging device has driving conditions differing from that of the second solid-state imaging device.

17. The imaging apparatus according to claim 16, wherein the number of the light receiving pixels of the first solid-state imaging device differs from the number of the light receiving pixels of the second solid-state imaging device.

18. The imaging apparatus according to claim 9, wherein the second solid state imaging device has an infrared sensitivity that is greater than that of the first solid-state imaging device, and wherein the first and second timing control circuits selectively operate the first and second drive circuits in accordance with the illumination of the imaging subject such that the first and second drive circuits alternately drive the first and second solid-state imaging devices at predetermined time intervals.

19. An imaging apparatus comprising:
a plurality of solid-state imaging devices for generating information charges in accordance with an imaging subject and accumulating the generated information charges;
a plurality of drive circuits respectively connected to the solid-state imaging devices, wherein each of the drive circuits drives the associated solid-state imaging device to generate an image signal that corresponds to the information charges in accordance with a vertical scan timing and a horizontal scan timing;
a timing control circuit connected to the drive circuits, wherein the timing control circuit determines the vertical and horizontal scan timing of the solid-state imaging devices in accordance with a reference clock signal having a fixed cycle;
a selection circuit connected to the solid-state imaging devices, wherein the selection circuit selects either one of the image signals in synchronism with an operation timing of the solid-state imaging devices; and
a signal processing circuit connected to the selection circuit, wherein the signal processing circuit performs a predetermined imaging process on the selected image signal to generate image data,
wherein the selection circuit alternately selects one of the image signals at predetermined time intervals.

* * * * *